United States Patent [19]

Eng

[11] 4,360,957
[45] Nov. 30, 1982

[54] METHOD FOR FABRICATING AN EXHAUST GAS TREATING UNIT

[75] Inventor: King D. Eng, Fishkill, N.Y.

[73] Assignee: Texaco Inc., White Plains, N.Y.

[21] Appl. No.: 166,418

[22] Filed: Jul. 7, 1980

[51] Int. Cl.³ .............................................. B23P 15/00
[52] U.S. Cl. ................... 29/157 R; 427/244; 427/247; 428/379; 422/180; 29/419 R
[58] Field of Search ......... 264/257; 29/157 R, 419 R, 29/163.5 F; 422/180, 177; 427/435, 247, 244; 428/379

[56] References Cited

U.S. PATENT DOCUMENTS

| | | | |
|---|---|---|---|
| 2,003,935 | 6/1935 | Howard | 427/244 |
| 2,616,165 | 11/1952 | Brennan | 29/419 R |
| 3,096,204 | 7/1963 | Spangler et al. | 427/244 |
| 3,278,279 | 10/1966 | Kraft et al. | 428/379 |
| 3,562,895 | 2/1971 | Niebergall et al. | 29/419 R |
| 3,918,141 | 11/1975 | Pepper et al. | 29/419 R |
| 4,289,810 | 9/1981 | Eng et al. | 427/244 |

*Primary Examiner*—Daniel C. Crane
*Attorney, Agent, or Firm*—Carl G. Ries; Robert A. Kulason; Robert B. Burns

[57] ABSTRACT

Method for fabricating a filter or catalytic reactor for hot exhaust gases, which includes a filter bed made from a frangible material such as steel wool or the like. The latter is confined and formed into a quasi-rigid body by application of an initial outer hardenable surface of a rigidizing material. Thereafter the preformed bed in an unconfined state, is treated to provide it with a uniform coating to a desired thickness in anticipation of being fitted into an appropriately shaped casing.

9 Claims, 3 Drawing Figures

METHOD FOR FABRICATING AN EXHAUST GAS TREATING UNIT

BACKGROUND OF THE INVENTION

One of the most effective media for treating a gas such as an internal combustion engine exhaust gas to remove solid particulate matter therefrom, comprises shredded metal, such as steel wool or the like. When properly shaped, such a media, even though frangible in nature, can be compressed to give a desired density and filtering capacity for contacting gas passing therethrough.

In many instances, filters or reactor beds of this type are coated with an external material to achieve a particular result. The coating can comprise a catalyst or other suitable element which is capable of promoting a reaction when contacted by a hot gas.

In the instance of the treating of an exhaust gas from an internal combustion engine, the gas often reaches temperatures having an order of magnitude of 1600° F. Such elevated temperatures are deleterious to a metallic filter of the type contemplated since they can substantially weaken or thermally degrade the metal. Thus, over a period of time, the entire filter or reactor bed will tend to distort or even collapse under gas pressure.

When the latter occurs, the bed will shrink and draw away from its enclosing casing. Such an action creates bypasses for the flow of gas such that at least a part of the latter can avoid the filter media and pass directly to the filter discharge port.

It is of further note that filters or reactor beds of the type contemplated are normally initially assembled with the bed inside a casing. The assembled unit is thereafter treated with a catalyst or similar coating. The surfaces of the filter bed will not under such circumstances receive a homogeneous coating.

For example, those parts of the bed which contact casing walls can be deprived of a coating layer or receive but a minimal layer. In effect, the active coating will not only be incomplete; it will often be lacking at the periphery of the filter bed. This segment of the bed can be vital, particularly when and if the bed tends to contract and draw away from adjacent casing walls as a result of exposure to the gas being treated.

In overcoming the above stated problems, there is presently provided a method for forming a filter or reactor bed particularly adapted for treating a stream of particles carrying hot exhaust gas.

The unit embodies essentially a reactor bed which is formed of a media comprised of randomly disposed fibrous metallic strips. The latter are preferably formed of a metal such as steel wool or the like. Prior to being assembled into a gas confining casing, the bed is preformed to provide it with a desired size, density and shape to best register within a particular casing.

While being retained in the desired shape within retaining means, the media bed is treated with a coating solution such that all exposed surfaces receive a preliminary hardenable layer. Thereafter the bed is removed from its restraints. However, the thin preliminary layer is sufficiently supportive to maintain the metallic fibers making up the bed within the latter's required dimensions. The partially coated, though still fragile form is now immersed into the same or other coating solution wherein it is maintained until such time as the required thickness or layer has been deposited onto the preliminary layer.

It is therefore an object of the invention to provide a method for fabricating a unit which is capable of removing solid particles from a hot exhaust gas stream. A further object is to provide a method for fabricating a filter or reactor of the type contemplated which includes a preformed bed adapted to receive a stream of gas to be treated which bed is characterized by a homogeneity of structure and density. Another object of the invention is to provide a method for applying a substantially uniform layer of a coating material onto the diverse surfaces of a filter or reactor bed comprised of randomly disposed metallic fibers or strips. Still another object is to provide a method for premolding and treating a fibrous mass of reactor media to apply a uniform coating to all the surfaces thereof.

In the following description, the terminology "filter" and "reactor", are used to designate units of the type adapted for contacting a stream of particle carrying gas. Preferably the gas is sufficiently hot to be reacted with a catalyst or other material with which it comes in contact. For the purpose of uniformity, the terminology "reactor" will be hereinafter used to designate the unit into which the instant frangible bed is incorporated.

Figure 1:
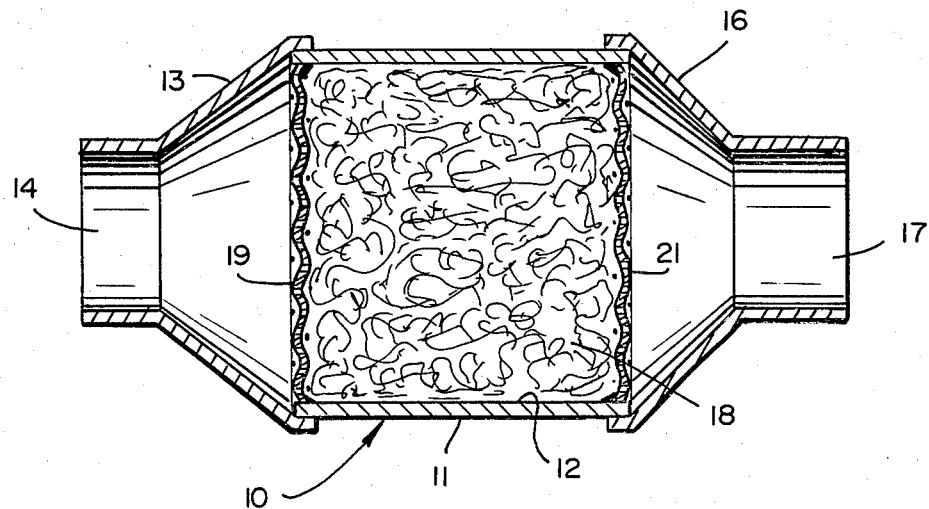
FIG. 1 is an elevation view in cross section illustrating a reactor or filter unit of the type contemplated.

A reactor unit 10 of the type contemplated is shown in FIG. 1, and includes primarily a casing 11 which is preferably formed of a cylindrical or oval cross section. The casing is generally fashioned of a metal capable of withstanding the hot temperatures and the conditions under which the units will normally operate.

Such reactor units when applied to automotive use include a steel casing which is shaped to define reaction compartment 12. The inlet end of casing 11 is fashioned with a conical end wall 13 including an inlet port 14. The latter is adapted to be removably connected to a source of the hot exhaust gas to be treated such as the exhaust pipe or manifold of an internal combustion engine.

The outlet side of reactor 10 is provided with a similar end wall or closure 16 including exhaust port 17. Through the latter, a flow of the treated gas will pass into the atmosphere, or into means for further treating the gas as is needed preliminary to its being discharged into the atmosphere.

The frangible filter or reactor media of the type presently contemplated for bed 18 can in one embodiment be formed of any one of a number of metals or discrete fiber-like strips of metal. The latter are disposed in a random mass to provide copious tortuous passages for gas passing therethrough.

The metal fibers or fibrils from which the reactor media are made, desirably are characterized by maximum strength for the diameter of the fiber. They are further resistant to detrimental effects that might be induced in the metal as a result of its range of operating temperatures. Typical examples of metals applicable to the purpose include steel, copper and nickel. Even certain ceramics can be adapted for use in the unit.

In the present disclosure, the most usual filter medium is comprised of steel wool. The latter is found to be capable of withstanding relatively high engine exhaust temperatures. Further, it exhibits sufficient resistance to withstand changing gas temperatures and operating conditions.

The prior art has taught the use of a number of coatings or cohesive layers which can be applied to the media of reactor beds of the type herein discussed to afford them certain desired characteristics. For example, it is known that the media surfaces can be treated with an optimum thickness of alumina or base metal.

The alumina layer or coating can serve as the contact surface for passing gas; alternately it might serve as the substrate for a further layer of a catalytic material. Normally, the presence of such a material will serve to catalyze a reaction of combustible elements carried in or on the exhaust stream.

In any event, steel wool as will be hereinafter referred to for the purpose of describing the invention, when compressed, defines a relative pliable and open area for the passage of gas therethrough. To be most effective however, the steel wool mass is compressed to a predetermined density whereby to provide optimum contact, and yet minimal resistance to the passage of exhaust gas. Thus, a particulate material carried on the rapidly flowing gas stream will be most effectively removed or reacted as a result of contact with the reactor bed surface.

In one embodiment of the method for forming the instant reactor bed, the finished unit will be in a quasi-rigid condition and will be capable of fitting tightly within a confining casing. Normally, a single reactor bed will be contained within the casing. However, and referring to FIG. 1, reactor compartment 12 can be designed to accommodate two or more sequentially aligned filter beds which successively receive the flow of gas therethrough.

Similarly, the entire bed 18 or the individual spaced apart beds, can be provided with physical support means such as end screens 19 and 21. Functionally, the latter bear against bed 18 when the bed becomes weakened and tends to distort as a result of exposure to high temperature exhaust gases.

Figure 2:
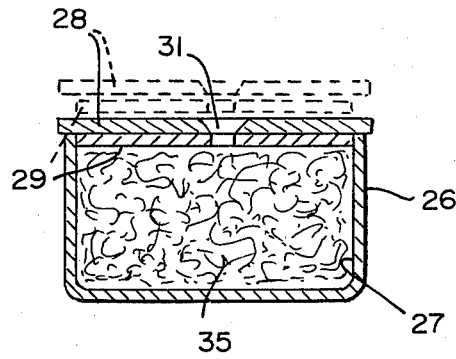
FIG. 2 is an elevation view in cross section of a mold particularly adapted for precoating a filter bed.
Figure 3:
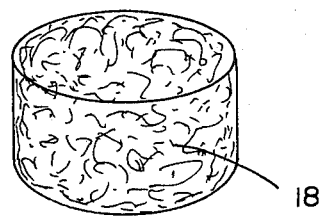
FIG. 3 is a segmentary view of the bed shown prior to insertion into a filter reactor chamber.

Referring to FIG. 2, to preform a desired conformation of reactor bed 18, a mold 26 is initially provided. A cavity 27 therein is substantially equivalent in size and configuration to reactor compartment 12 of casing 11.

Mold 26 can be fabricated of a metal such as steel, brass, or the like having a shaped cavity 27. Alternately, the mold body can be built of a plurality of cooperative segments to define the circular periphery of the bed unit. In one embodiment, the mold is formed of two shaped members which can be split apart to allow access to the internal cavity.

In the mold of FIG. 2, closure piece 28 is fitted to the cavity 27 open end. Said closure piece 28 can include a downwardly depending circular hub 29 which registers within the cavity 27 opening rim to determine the depth of the bed 35 subsequently formed.

To facilitate removal of bed 35, mold 26 can be formed of, or merely lined with a pliable material such as Teflon or the like. A mold of this character will serve to confine the bed to insure its shape, but will not offer undue resistance to removal of a partially coated bed.

As noted above, a metallic mold can be provided with a cavity 27 having walls which are coated with a Teflon or the like to facilitate removal of the partially coated bed. Further, the Teflon liner can constitute a thin member or removable liner which serves to prevent bonding of bed 35 to mold walls. Here the liner would merely envelop the bed rather than restrain it.

With closure 28 held firmly in place to compress the steel wool mass to a predetermined thickness, a coating solution of a desired mixture is introduced through opening 31 into cavity 27. The solution permeates and contacts the metallic mass of fiber for a predetermined period and at a preferred temperature to apply a preliminary coating to contacted surfaces.

In another embodiment, the walls of mold 26 can be provided with perforations or other access openings to permit passage of coating liquid therethrough. Thus, the entire mold can be immersed into a bath of the initial coating solution. The mold can thereafter be moved about or otherwise supported to assure contact between bed 35 surfaces and the coating solution.

One form of preliminary coating found suitable to maintain the reactor bed in a rigid condition is comprised of a layer of alumina which is applied to the exposed surface of the bed. The steel wool mass, while confined to mold cavity 27, is thus furnished with a thin film or sublayer of alumina.

The latter can be applied by contacting the confined mass with a solution of alkali metal aluminate, such as sodium aluminate. While for the instant description reference is made to sodium aluminate solution as the coating material, it is understood that similar solutions such as potassium aluminate are also satisfactory to the purpose.

After this preliminary coating has been applied, the reaction is discontinued by removing the coating solutions from the mold, or the mold out of the solution bath. This is achieved by draining or otherwise emptying the mold of solution.

The relatively frangible thinly coated bed 35, after a short setting period, will now be in condition to be removed from its confining mold without disturbing the bed's configuration and shape. Notably, the thin coating layer will support the overall shape of bed 35 but will not form an appreciable bond with the enclosing mold walls.

In the now quasi-rigid condition, the bed can be baked or merely permitted to set. The bed is again immersed into a bath of a coating liquid. Since the shape of the bed is assured even though released from its confines, it can be suspended or otherwise exposed to the circulating coating solution for a desired period.

Eventually, the second or outer coating layer will be deposited onto the preliminary layer. The aggregate layer will then be at a substantially uniform thickness suitable for use in a particular reactor unit.

The bed 35 thus prepared, when removed from the coating solution bath will be capable of maintaining its desired shape over an extended period. Further, the alumina coating when used alone, will be at a constant thickness along all the bed's surfaces, thereby assuring a relatively uniform and effective reaction with the passing gas.

For the purpose of fabricating a filter or reactor unit, casing 11 is provided with at least one open end. Thereafter, a support screen 19 is inserted transversely of the reaction chamber 12. A preformed bed 18 can now be inserted either singly, immediately adjacent to another bed, or even spaced apart from another bed in the chamber.

After the respective reactor beds 18 are in place, second screen or support panel 21 is positioned within the casing. Thereafter, the end wall 13 is fastened into place thus confining bed 18 within a chamber adapted to receive gas.

The filter unit 18 is now in condition to be inserted into an engine's exhaust system whereby the hot exhaust gas will enter the inlet 14, contact the bed 18 and subsequently be discharged through opening 17.

The sodium aluminate or potassium aluminate coating solution herein noted for treating the beds 18 can be prepared by any of several known methods. For example, aluminum pellets or alumina, can be dissolved in a relatively strong aqueous solution of sodium hydroxide. The steel wool bed 18 is thereafter contacted with the resulting solution of sodium aluminate optionally in the presence of metallic aluminum. The contact or immersion period as mentioned, is sufficient to form the desired preliminary coating of alumina or the subsequent second coating onto the surface of the various metallic strips.

In one example of the disclosed method, a steel wool pad or bed 35 was prepared in which the individual fiber thickness was about 0.010 inches. The bed was confined within a shaping mold and exposed to the coating solution.

The mold was immersed in coating solution for a sufficient time to apply an 0.004 inch layer of alumina to the wire surface. After the bed 35 was removed from the mold it was found to retain its desired shape and configuration due to the thin preliminary layer.

Thereafter, free of the mold 27, bed 35 was immersed to apply a second layer at a temperature between about 180° and 200° F. After the second immersion by suspending the bed in solution, the bed was removed. While not an essential step, the aggregate layer can now be calcined or baked to expedite the setting process.

In carrying out either first or second layering steps, the concentration of the sodium aluminum solution should not be less than about 0.5 molar, and preferably at least one molar, in order to deposit or form the preliminary as well as the subsequent alumina coating of sufficient depth to be serviceable. Generally, a solution having a concentration of about 1 to 5 molar is satisfactory.

Where desired, more or less concentrated solutions can be employed, that is 0.1 molar to about 30 molar. There appears, however, to be no advantage in employing solutions having a concentration greater than 10 molar or less than 0.5 molar.

Although a coating solution of sodium aluminate at room temperature can be used, formation of the composite layer is somewhat facilitated by contacting the steel wool with a solution of sodium aluminate maintained at an elevated temperature. The latter as noted can be about 180° to 200° F. It is understood however that the temperature of the solution can determine to a considerable extent the character of the overall layer.

Other modifications and variations of the invention as hereinbefore set forth can be made without departing from the spirit and scope thereof, and therefore, only such limitations should be imposed as are indicated in the appended claims.

I claim:

1. Method for fabricating a reactor unit having a thermally stable, reactant coated, gas permeable reactor element which includes the steps of:
    initially confining a mass of a fibrous metallic reactor media within a constricting and shaping means,
    depositing a hardenable layer of a base material to surfaces of the confined reactor media in sufficient amount to form a cohesive, quasi-rigid mass which will retain a configuration equivalent to the shaping means subsequent to said layer, of base material becoming dried, and said quasi-rigid media mass being released from the confining means,
    removing the confining and shaping means from about the coated fibrous mass, and applying an external layer of reactant material on to said base layer to a desired thickness thereby producing a reactor element,
    installing said reactor element within a reactor casing.

2. In the method as defined in claim 1, wherein said fibrous media mass is initially confined within a liquid holding means to apply said hardenable base layer.

3. In the method as defined in claim 1, wherein said hardenable base layer is applied by immersing the confined fibrous media mass in a coating solution.

4. In the method as defined in claim 3, wherein said hardenable base layer is applied by immersing the confined fibrous media mass as well as the constraining means within a coating solution.

5. In the method as defined in claim 1, wherein said fibrous media mass is initially confined within a liquid holding mold, and a coating solution is introduced to said mold for contacting surfaces of said fibrous media mass.

6. In the method as defined in claim 1, wherein said external layer of material is applied by contacting the cohesive mass with a coating solution.

7. In the method as defined in claim 1, wherein said external layer of reactant material is applied by immersing the cohesive mass within a coating solution.

8. In the method as defined in claim 1, wherein the composition of the hardenable base layer is substantially equivalent to the composition of the outer layer which is applied to said cohesive mass.

9. In the method as defined in claim 1, wherein said hardenable base layer consists of alumina.

* * * * *